(12) United States Patent
Vane et al.

(10) Patent No.: US 6,881,364 B2
(45) Date of Patent: Apr. 19, 2005

(54) HYDROPHILIC MIXED MATRIX MATERIALS HAVING REVERSIBLE WATER ABSORBING PROPERTIES

(75) Inventors: Leland Morris Vane, Cincinnati, OH (US); Ravi Prasad Ponangi, Modesto, CA (US)

(73) Assignee: U.S. Environmental Protection Agency, Washington, DC (US)

( * ) Notice: Subject to any disclaimer, the term of this patent is extended or adjusted under 35 U.S.C. 154(b) by 221 days.

(21) Appl. No.: 10/145,383

(22) Filed: May 15, 2002

(65) Prior Publication Data

US 2003/0008966 A1 Jan. 9, 2003

Related U.S. Application Data

(60) Provisional application No. 60/291,014, filed on May 16, 2001.

(51) Int. Cl.$^7$ .................. B29C 67/20; B29C 71/00; B29C 71/02
(52) U.S. Cl. .................. 264/41; 264/216; 264/236; 264/237
(58) Field of Search .................. 264/41, 216, 236, 264/237

(56) References Cited

U.S. PATENT DOCUMENTS 4,016,129 A * 4/1977 Miyosawa .................. 524/557

* cited by examiner

*Primary Examiner*—Leo B. Tentoni
(74) *Attorney, Agent, or Firm*—Hendricks & Associates; Glenna Hendricks, Esq.

(57) ABSTRACT

Polymer-ceramic mixed matrix compositions contain one or more organic polymers and a nano-sized dispersion of inorganic metal oxide particles which are dispersed throughout the composition. Materials have use in making membranes that act as transfer agents.

3 Claims, 1 Drawing Sheet

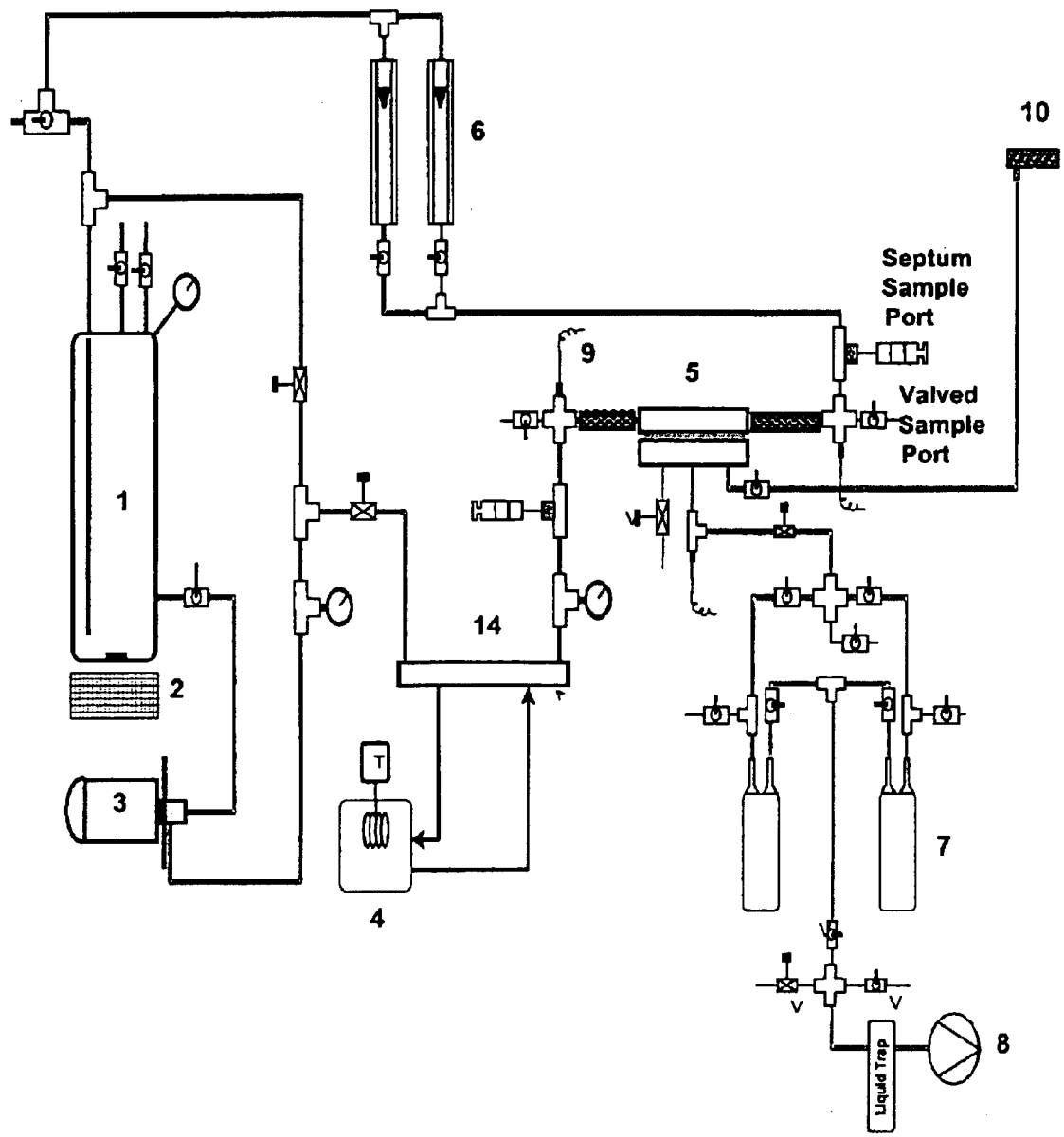
FIG-1. Pervaporation Bench Unit

HYDROPHILIC MIXED MATRIX MATERIALS HAVING REVERSIBLE WATER ABSORBING PROPERTIES

This application takes priority for U.S. provisional patent No. 60/291,014 filed May 16, 2001.

FIELD OF THE INVENTION

The invention relates to the field of membranes and gels that are used to dehydrate organic streams and the preparation of novel mixed matrix composites useful in such processes. Membranes are comprised of a hydrophilic matrix containing at least one organic polymer and an inorganic metal oxide dispersed through the polymer. Gels made from the mixed matrix materials can be fabricated in a variety of shapes depending upon the container in which they are developed. The gels may be re-used in the dehydration process once they are stripped of their water content.

BACKGROUND OF THE INVENTION

Alcohols, in particular, 2-propanol (isopropyl alcohol-IPA), are being increasingly utilized in various industries as solvents and cleaning agents. Purification of alcohol streams when contaminated by water at certain concentrations become difficult due to the formation of azeotropic mixtures, wherein the equilibrium vapor and liquid compositions are the same. Such azeotropic mixtures of alcohol and water cannot be separated by normal distillation but only through complicated processes. Frequently, an additional substance is added to break down this azeotropic mixture. This additional substance must subsequently be completely removed and recovered from both product streams. An easy, efficient recovery and reuse of alcohols is imperative in view of the process economics and to meet environmental regulations. Prior art processes using other memmbranes and gels did not have the desirable properties of the compositions of this invention.

Pervaporation and vapor permeation are membrane based operations, in which water-free alcohols can be produced in a simple and energy efficient way. In pervaporation, water from a contaminated organic stream is preferentially transported across a thin membrane film. The source side of the membrane is wetted with the organic liquid. A vacuum or a sweep gas is used on the sink side of the membrane. The water is collected from the sink side by condensation.

Vapor permeation is similar to pervaporation with one major difference-vapors instead of liquid contact the source side of the membrane. In contrast to other membrane filtration processes, pervaporation/vapor permeation works according to a solution diffusion mechanism. The membrane itself must be non-porous for pervaporation to work.

In microfiltration or ultrafiltration, for example, porosity is the key to preferential transport, and the flux rate depends upon molecular size. In pervaporation/vapor permeation, molecular interaction between membrane and separated species is the determining factor rather than the molecular size. The main component of the pervaporation/vapor permeation process is the membrane material which determines the permeation and selectivity and hence the separation properties of the process.

For pervaporation and/or vapor permeation to be economical and efficient, ultra thin, non-porous, hydrophilic films of appropriate polymer need to be deposited onto a highly porous support matrix. Such a combination will provide high throughput along with good mechanical stability and thus result in achieving the desired separation using minimum membrane area. Since water needs to be transported across the membrane, a high trans membrane flow hydrophilic membrane must be used. The trans membrane flow is a function of the composition of the feed. It is usually expressed as permeate amount per membrane area and unit time, e.g. kg/m2-hr, for the better permeating component.

A further essential criterion for the suitability of the pervaporation membrane is its chemical and thermal stability. To obtain a high transmembrane flow and a sufficient driving force, it is necessary to operate the pervaporation process at the highest possible temperatures. This means that the membrane will be in contact with a feed mixture at high temperature which has a high concentration of organic components.

To achieve an economical lifetime of the membranes all components of the membrane must be durable under aggressive conditions. The most common dehydration membrane reported in literature for use in pervaporation processes is prepared from polyvinyl alcohol (PVA).

PRIOR ART

Miyosawa, U.S. Pat. Nos. 4,016,129 and 4,330,446 describes a hardenable coating comprising an aqueous dispersion of silica polyvinyl alcohol complex prepared by the reaction between colloidal silica dispersion and polyvinyl-alcohol solution. However, this patent does not provide for the particle dispersion described herein.

U.S. Pat. No. 4,148,689 to Hino, et. al. describes immobilization of microorganisms by hydrophilic complex gels by mixing a water soluble polymer selected from: PVA, gelatin and carboxymethylcellulose with tetraalkoxysilane hydrolyzing the resulting mixture by the addition of acid to form a homogenous complex sol; dispersing the microbial cells in the sol and gelling the mixture. This patent mentions that it is impossible to obtain the homogenous complex transparent gel when silica sol and silica gel were mixed with water soluble polymers. The problems identified in this patent are not solved by the invention described therein.

U.S. Pat. No. 4,279,752 describes uniform, porous PVA membranes. This process includes extracting the silica particles from the partially developed membrane. However, this patent does not teach the homogenous dispersion of silicon dioxide particles.

SUMMARY OF THE INVENTION

The invention comprises a novel and highly advantageous method of preparing membranes and gels composed of hydrophilic mixed matrix material as well as use of the matrix material as a mass transfer agent, in particular, as a pervaporation membrane.

In the present innovation, novel polymer/ceramic composite membranes will be used to effect the alcohol/water separation. The polymer/ceramic mixed matrix membranes described in the present invention contain at least one, and, possibly, more than one, hydrophilic polymer along with nano-sized silicon dioxide particles dispersed throughout the membrane matrix and cross linked using either an acid or an aldehyde. The incorporation of a dispersion of nano sized silicon dioxide particles results in improved wetting characteristics of the matrix as a result of water absorption by the SiOH groups.

The invention is demonstrated by utilizing PVA and/or an amine polymer as a hydrophilic polymer and maleic acid or glutaraldehyde as cross linking agent. The polymer/ceramic membranes are fabricated into either homogenous or composite type which are clear (without any phase separation) and loaded with silicon dioxide particles.

In the preferred embodiment, the addition of a second polymer (namely poly allylamine hydrochloride) into the PVA-silicon dioxide material produces a mixed matrix material that is homogenous, strong and clear without any phase separation between organic polymers and silicon dioxide particles i.e. without any settling out of the silicon dioxide particles. Additionally, the present work describes a method to fabricate very thin films using the polymer/ceramic materials that are capable of performing the intended separations, namely dehydration of organic streams. The novel hydrophilic membrane of the present invention is unique in its steady state character in as much as the steady state permeability of the membrane has been altered by the inclusion of solid particles.

In addition to membranes, this invention includes mixed matrix gels of the aforementioned compositions which are prepared in a variety of shapes and show a remarkable degree of reversible water absorbing properties. Mechanical and physical properties of the gels, such as extent of swelling in water can be controlled by controlling the mixed matrix material composition.

DESCRIPTION OF DRAWINGS

FIG. 1 shows overall view of processes of pervaporation

DETAILED DESCRIPTION

Definitions: By "mass transfer agent" is meant a broad range of products that take up liquid such as water including membranes used for pervaporation and vapor permeation but also including dessicants and sorbents. Gel particles may function as sorbents in this context. The term "gel" may also be used in the industry to refer to the coating used in the composite membranes although the invention description herein uses the terms "gel" in example 6 and 7 refer to a product most likely used as desiccant.

It is desirable to combine certain polymers having desirable properties of flexibility, adherence, and film formation, with those of a suitable ceramic in order to develop novel hydrophilic mixed matrix materials suitable as mass transfer media for dehydrating organic streams by a variety of separation processes. Mixed matrix materials may be fabricated into thin membranes for use in pervaporation/vapor permeation separation processes. The ceramic component materials were selected as membrane materials for this use in these separation processes based upon their increased strength and thermal resistance.

The separation efficiencies of the different mixed matrix membranes were evaluated by comparing two values, namely flux and selectivity. These two values were evaluated by experimentation involving the varying of a number of experimental conditions namely: feed temperature, flow rate, concentrations and permeate pressure.

The use of a properly selected absorbent in the present invention along with compatible polymer in accordance with the teachings herein, makes it possible to obtain a mixed matrix membrane having outstanding flux capabilities for given fluid mixtures. This difference in flux is due to the alteration in steady state permeability which has been imparted to the hydrophilic mixed matrix membrane in contrast to the steady state permeability of the organic polymer.

Use of the novel mixed matrix composites described herein will provide a viable separation process by which fluid components, and, in particular, water and isopropyl alcohol (IPA), may be separated because of the marked differences in their respective permeabilities through the hydrophilic mixed matrix membranes.

It is an object of the invention to provide membranes and gel compositions comprising a matrix of at least one hydrophilic polymer and a dispersion of an inorganic metal oxide having improved wetting and durability properties for use in separation processes involving pervaporation and vapor permeation.

Another object of the invention is to provide mixed matrix gels which possess the ability to have high swelling when placed in water but which remains insoluble in water.

Another object of the invention is to provide mixed matrix gels with reversible water absorbing properties that retain their shape characteristic after the reverse water removal process.

Another object of the invention is to develop a simple fabrication method for the preparation of the mixed matrix membranes from inexpensive and readily available materials.

The Pervaporation Process.

The mixed matrix materials described in the present invention were fabricated using commercially available chemicals namely: PVA, 99% hydrolyzed; Poly (allylamine hydrochloride); glutaric dialdehyde (glutaraldehyde), 50% by wt. solution in water, and maleic acid 99%. Two types of backing materials were used for composite membrane preparation—1) METRICEL POLYPRO, a porous, mixed cellulosic, ester material sold by Gelman Sciences, using a 0.1 micron pore size and polyamide AK membranes obtained from Osmonics Corporation, USA. The polyamide membranes in this case being asymmetrical in nature. The colloidal silica product was obtained from Nissan Chemical Industries, Ltd. (USA). under the names: SNOWTEX-O, 40, and UP. SNOWTEX-O is a clear, aqueous, colloidal silica sol having a pH of 2–4 and containing 21.5% by wt. nano sized particles (10–20 nanometers) of silicon dioxide dispersed in water.

A schematic diagram of a pervaporation bench scale unit according to the present invention is shown in FIG. 1. The feed tank (1) was a 20 liter stainless steel ASME pressure vessel. The feed consisting of IPA and water mixture, varying in water concentration from 5–20% wt is made up in the feed tank by adding predetermined amounts of IPA and water. The feed mixture was circulated between the feed tank which contained a magnetic stirrer (2) and the pervaporation cell (5) in a closed loop using a gear type liquid pump (3). Liquid flow rate was measured with a rotameter (6).

The temperature of the feed liquid was held constant by passing the feed through the inner tube of a tube in tube heat exchanger. The temperature of the shell fluid was controlled via a thermostated recirculating bath. The feed liquid temperature and the permeate vapor temperature were monitored by two thermistor thermometers inserted in the upper and lower compartment of the cell, respectively. The temperature gauge is shown as (9) in FIG. 1.

A vacuum gauge (10) monitored the downstream pressure and the vacuum system (8) stabilized the permeate pressure to below 1 torr. Permeate was collected in a cold trap (7) cooled with liquid nitrogen. After a pervaporation experiment had been initiated a three to four hour equilibration period was employed to reach the steady state mass transfer regime.

After this initial regime, steady state permeation collection was initiated. The experiments were run batch wise over a time interval of two hours. The permeate liquid thus recovered was weighed and analyzed to evaluate permeation flux and selectivity. The total flux was simply calculated from the amount collected. The selectivity was calculated from the feed and permeate compositions.

A stainless steel membrane filtration cell fabricated in house with an effective membrane area of 40.0 cm$^2$ was used in cross flow mode. The membrane was supported by a fritted stainless steel support. The cell was sealed by Viton O rings. The feed entered the cell at one end of the upper compartment, flowed along the length of the membrane and exited the cell at the opposite end of the upper compartment. The feed circulation across the test cell was 1500 ml./min. of IPA/water mixture. Separation experiments were conducted at temperatures of 30°, 40°, 50°, 60°, 70°, and 75° C.

Two feed samples were taken for each run, one at the beginning and another at the end. The reported feed concentration was the average concentration of these two samples. One permeate sample was acquired during each run. The cold trap was first weighed after warming to room temperature and then the permeate sample was dissolved in 20–30 ml. of methanol. All feed samples and some permeate samples required dilution in methanol in order to fall within the analytical calibration range. All diluted samples were transferred immediately to 20 mL vials capped with Teflon lined septa.

The composition of both feed and permeate were analyzed by direct injection gas chromatography (GC) using HP 6890 series GC equipped with a flame ionization detector.

Novel Mixed Matrix Materials.

The mixed matrix membranes described in the present disclosure comprise certain organic polymer materials having a solid particulate adsorbent incorporated therein. In the preferred embodiment of the invention, the organic polymer material will be selected from the group of materials having affinity for water. The solid particulate adsorbent material which is incorporated in the hydrophilic organic polymers will be nano sized materials, which also possess hydrophilic characteristics.

The mixed matrix membrane which is prepared according to the process of the present invention possesses the ability to effect the separation of various components of a fluid (particularly water) from alcohols present in a feed mixture by utilizing the differences in the steady state permeability characteristics of each component of the mixture. The desired separation effect is enhanced by incorporating an adsorbent with certain polymeric materials.

The membranes used are preferably composite membranes comprising a dense non-porous layer on a support material, the dense non-porous layer being applied to the support material by solution casting followed by crosslinking. The support material used is a porous support material and, preferably, an asymmetrical porous support material, i.e. a porous support material which has pores of different average diameters on the front and the back. Suitable supports are based for example on materials having hydrophilic characteristics. One such porous support material used is commercially available reverse osmosis membrane.

Applying PVA based mixed matrix casting solution onto a porous backing layer forms a non porous separating layer. Aqueous solutions of PVA vary in concentration from a low level of 0.5 wt. % up to an upper limit determined by the solubility limit of polyvinyl alcohol (PVA) in water. Note the solubility limit of PVA in water depends upon the degree of hydrolysis and molecular weight of the polyvinyl alcohol. The optimum PVA concentration range is from 5 to 8 wt. %.

After applying the mixed matrix polymer/ceramic solution to the porous backing layer, crosslinking takes place during drying under the action of the crosslinking agent. Elevated temperatures between room temperature and 200° C. accelerate the drying and cross linking. The temperature will normally lie in the range of 80° C. to 180° C., preferably 100° to 150° C. The cross linking time is in the range of 1 to 60 min. preferably 5 to 30 min.

The mixed matrix gels which are prepared according to the process of the present invention will possess the ability to have much swelling when placed in water but are insoluble in water at the same time. The gels are formed by excluding a small quantity of water from the starting homogenous aqueous solutions and, as such, are swollen, though insoluble in water. Gels having a variety of mechanical and physical properties as well as a varied extent of swelling in water can be prepared by controlling the initial mixed matrix material composition.

The gels acquire the shape of the container in which they have been developed and can be formed into a variety of different shapes. The water-swollen mixed matrix gels, when dried, result in very hard materials that are greatly reduced in size compared to the starting water-swollen gels. The dry and hard materials show high swelling when placed again in water without any disintegration. Such a reversible water absorbing property, while retaining the shape of the container, can be attributed to the dispersed particulate silicon oxide.

EXAMPLE 1

The following example describes the general method for the preparation of mixed matrix membranes. To a granular PVA, water was added so as to yield PVA concentration in the range of 5–10 wt. %. Clear and homogeneous PVA solutions were obtained upon heating the mixture for 5 hours in an oven kept at 100° C. The solution is cooled to room temperature before further use. A predetermined amount (0.15–1.0 g.) of cross linking agent (acid or aldehyde) is added to 25–30 g. of the above polymer solution and shaken well until the cross linker completely dissolves.

Next, 2–10 g. of a clear aqueous solution containing 21.5 wt. % of nano sized silicon dioxide particles was added and shaken well to obtain a clear mixed matrix solution. Additionally, in some formulations a 10–15 wt % aqueous amine polymer solution was added and shaken well until all the components are homogeneously mixed. The studies carried out reveal that mixing is very important in order to avoid phase separation and obtain clear and homogenous membranes. Depending on the final membrane thickness required, the above contents were diluted by the addition of 0–30 g. of water. The mixture was left to stand for 1–4 days at room temperature to facilitate the removal of bubbles. Stand alone (or homogenous) membranes were cast by spreading the above solution on a neutral temporary medium such as clear plexiglass. Glass is another example of a temporary neutral medium. Composite membranes are cast on a backing material such as a reverse osmosis membrane.

Allowing the cast solution to stand at room temperature for 0–6 hours to remove water results in the formation of a semi-dry membrane that is thinner and more viscous. The film is then cross linked at 150° C. for 5–120 minutes. Ten to sixty minutes before testing the membranes for their separation efficiency, the cross-linked membrane is soaked in a solution of IPA/water (same composition as the feed for which the membrane is to be used). This soaking was found to ease membrane handling and fixing in the test cell, especially for the membranes containing only one polymer.

EXAMPLE 2

Homogenous membranes were prepared according to the general method described in example 1 with the following modification: Membranes were prepared without the addition of second polymer. Maleic acid was employed as cross linking agent with the crosslinking carried out for either 30 or 90 minutes at 150° C. Dehydration of IPA/water mixtures were carried out according to the procedure outlined above and results, flux vs. feed temperature, given in Table. 1.

TABLE 1

Effect of SiO2 and Crosslinking Time on dehydration of IPA for example 2.
Feed concentration: IPA 80 wt. % and Water 20 wt. %
Permeate concentration: 97–98 wt. % water

| Feed temperature (° C.) | Total flux (g/m²-hr.) | | |
|---|---|---|---|
| | 0 wt. % SiO2 30 min. cross linking | 30 wt. % SiO2 30 min. cross linking | 30 wt. % SiO2 90 min. cross linking |
| 30 | — | 75 | 12 |
| 40 | 79 | 100 | 45 |
| 50 | 146 | 181 | 77 |
| 60 | 209 | 320 | 137 |
| 70 | 389 | 495 | 213 |
| 75 | 550 | 670 | 261 |

The effects due to increase in the feed temperature and membrane cross-linking time were on the expected lines, flux increasing with feed temperatures and decreasing with the increased crosslinking time.

Table 1 also details the effects of SiO2 presence and absence in the mixed matrix membranes that were crosslinked for the same mount of time (30 minutes). At a given temperature, the presence of silicon dioxide particles in the membrane resulted in an increase of the water flux. The increased water flux can be attributed to the presence of SiO2 in the crosslinked PVA matrix which may provide additional pathways for the separation of water. The membranes showed very good separation efficiency. The permeate always contained more than 98.5 wt. % water (compared to 20 wt % in the feed).

EXAMPLE 3

Membranes were prepared according to the general procedure described in the example 1 with the following modifications: Composite mixed matrix membranes were prepared by casting PVA/SiO2/poly(allylamine hydrochloride)polymer solution on Gelman Sciences backing. Table 2 lists the results obtained on carrying out the dehydration of a feed stream containing 90 wt. % IPA and 10 wt. % water mixture by pervaporation. The presence of poly (allylamine hydrochloride) in the membrane has two effects: a) it imparted flexibility to the mixed matrix material and b) it resulted in increasing the hydrophilic nature of the membrane. As a result, the water flux increased as compared to results shown in table. 1 despite a decrease in the feed water concentration from 20 wt. % to 10 wt. %.

TABLE 2

Dehydration Results for Example 3

| Feed temperature (° C.) | Flux (g/m²-hr.) | | Permeate water concentration |
|---|---|---|---|
| | IPA | Water | |
| 40 | 10 | 256 | 96.3 |
| 50 | 12 | 357 | 97.4 |
| 60 | 17 | 541 | 97 |
| 70 | 30 | 802 | 96.4 |

EXAMPLE 4

Effect of variation of the permeate pressure on the separation of IPA/water is listed in table 3. Experiments were conducted at a temperature of 60° C. The water flux showed only a marginal decrease (12%) on increasing the absolute downstream pressure from 2 to 25 mm. Hg. The concentration of water at all permeate pressures in the permeate was more than 96 wt. %. The results indicate that dehydration of IPA need not be carried out at very high vacuum.

TABLE 3

Effect of Permeate Pressure for Example 4

| Permeate Pressure (mm Hg) | Flux (g/m² -hr.) | | Permeate water concentration (wt. %) |
|---|---|---|---|
| | IPA | Water | |
| 2 | 15 | 548 | 97.3 |
| 10 | 15 | 541 | 97.3 |
| 15 | 15 | 495 | 97.1 |

TABLE 3-continued

Effect of Permeate Pressure for Example 4

| Permeate Pressure (mm Hg) | Flux (g/m² -hr.) | | Permeate water concentration (wt. %) |
|---|---|---|---|
| | IPA | Water | |
| 20 | 18 | 492 | 96.5 |
| 25 | 18 | 475 | 96.4 |

EXAMPLE 5

The separating layer of the composite membrane contains a mixture of poly (vinyl alcohol) and poly allylamine hydrochloride) with nano sized silicon dioxide particles dispersed throughout the membrane matrix and crosslinked using glutaraldehyde. The backing used for preparing the composite membranes is commercially available polyamide reverse osmosis membrane obtained from Osmonics. The dry composite film was cross linked at 150° C. for 12 minutes resulting in a separating layer having the composition as shown in table 4.

TABLE 4

Composition of Separating Layer of Mixed Matrix Membrane (example 5)

| Material: | wt. % |
|---|---|
| PVA | 68 |
| Glutaraldehyde | 7 |
| SiO2 | 15 |
| Polyallylamine | 10 |

The results of performing dehydration of IPA by pervaporation shown in table 5 are as follows: 10% water/90% IPA in feed-flux=1050 gm/m2-hr @ 60° C., 1600 g/m2-hr @ 70° C. Permeate=97+wt. % water. for comparison, these results are at least two times more than those reported in example 4 (at same experimental conditions.) Table 5 also shows the results obtained with a decreased feed water concentration (5% water/95% IPA). Although the feed water concentration decreased by half (5 wt. % from 10 wt. %) the total flux dropped by 4–5 times with only marginal increase in permeate composition. All results shown in table 5 were found to be reproducible during testing lasting over a period of more than 40 days.

TABLE 5

Dehydration Results for Example 5.

| Feed temperature (° C.) | Total flux (g/m²-hr.) |
|---|---|
| Feed concentration: IPA 90 wt %/Water 10 wt. % Permeate concentration: 97–98 wt. % water. | |
| 40 | 342 |
| 50 | 575 |
| 60 | 1072 |
| 60 | 1044 |
| 70 | 1614 |
| 70 | 1578 |
| 70 | 1631 |

TABLE 5-continued

Dehydration Results for Example 5.

| Feed temperature (° C.) | Total flux (g/m²-hr.) |
|---|---|
| Feed concentration: IPA 95 wt %/Water 5 wt. % Permeate concentration: 98–99 wt. % water. | |
| 40 | 64 |
| 50 | 123 |
| 60 | 210 |
| 70 | 371 |

EXAMPLE 6

The general method for preparation of hydrophilic mixed matrix gels is as follows: Homogenous PVA solutions in the range of 5–10% were prepared by the same procedure as described above for the membrane preparation. A predetermined amount (0.15–1.0 g.) of cross linking agent glutaraldehdye is added to part of the above polymer solution and shaken well until the cross linker completely dissolves. Next 6–10 g. of a silica sol such as SNOWTEX-O is added and shaken well to obtain a clear solution. The mixture is then either allowed to stand at room temperature for 20–45 days or heated in an oven at a temperature of 50–80° C. for 1–3 days. The viscosity of the solution increases and forms into a gel that separates out from the container it is in during this process. The gel, a homogenous aqueous mixed material solution, will pull away from the sides of the container as water is expressed out of the gel. The process by which the water comes off the gel may be referred to as "excluded" from the homogenous aqueous solution. Gels produced by the process are swollen by, but are insoluble in, water. They have reusable and water sorbing characteristics. The gels acquire the shape of the container in which they develop and can thus be formed into a variety of different shapes. Gels having a variety of mechanical and physical properties, including their swelling ability in water can be prepared by controlling the initial mixed matrix material compositions.

EXAMPLE 7

The water-swollen mixed matrix gels of the present invention, prepared according to example 6, when dried result in very hard materials that are greatly reduced in size compared to the starting water-swollen gels. The dry and hard materials show high swelling when placed again in water without any disintegration. Such a reversible water absorbing property while retaining the shape, can be attributed to the dispersed particulate silicon oxide. Table 6 lists the composition of the gels and their swelling in water.

TABLE 6

Gel Composition and Swelling in Water (for example 7)
59.0 wt % PVA
38.0 wt. % SiO2
3.0 wt. % glutaraldehyde

|  | water swollen state | dry material state |
|---|---|---|
| length | 4.6 cm. | 3.3 cm. |
| diameter | 1.8 cm. | 1.1 cm. |
| Volume | 11.71 cm.$^3$ | 3.14 cm.$^3$ |
| weight | 11.3909 g. | 4.8638 g. |
| water uptake | 6.5271 g. |  |
| Swelling % (g/g) | 134% |  |
| Swelling % volume | 273% |  |

EXAMPLE 8

DSC (Differential Scanning Calorimetry) and TGA (Thermal Gravimetric analysis) measurements were carried out on polymer/ceramic mixed matrix membranes and gels. The results shown in table 7 indicate all the mixed matrix materials to have high glass transition temperatures relative to typical PVA material. Although there is a decrease in the glass transition temperature due to the inclusion of poly (allylamine hydrochloride), membranes fabricated from such mixed matrix material are still glassy and, as such, can be safely employed for high temperature dehydration operations. TGA results indicate a more gradual weight loss at high temperatures (300–600° C.) in all mixed matrix containing silicon dioxide particles (especially the hard materials obtained on drying water swollen gels) even at temperatures well over 600° C.

TABLE 7

Glass Transition Temperatures (Tg) for example 8.

| Material | Tg (° C.) |
|---|---|
| Example 5 poly (vinyl alcohol/silicon dioxide/poly (allylamine) and crosslinked using glutaraldehyde | 206 |
| Example 7 poly (vinyl alcohol/silicon dioxide and crosslinked using glutaraldehyde | 365 |
| Pure polyvinyl alcohol (for comparison) | 85 |

While silicon oxides are used, as exemplified herein, compositions containing other oxides such as zeolites or aluminum oxide may be used. It would also be clear to one skilled in the art that other organic polymers known in the art as equivalents may be used in the practice of this invention.

We claim:

1. A method of fabricating homogenous pervaporation/vapor permeation membranes comprising the steps of (1) forming a hydrophilic polymer based casting solution containing an aqueous solution of a polymer, a cross linking agent and an inorganic oxide; (2) casting said solution prepared in step 1 upon a neutral temporary medium; (3) heating the solution of step 2 at a temperature of 80° to 180° C. for 1–60 minutes, then (4) separating said membranes from said temporary medium.

2. The method of claim 1 where said hydrophilic polymer based casting solution comprises a 5–10 wt. % solution of poly vinyl alcohol and said inorganic oxide component comprises silicon dioxide.

3. The method of claim 2 wherein, in step (1) there is further heating of said casting solution for 1–5 hours, cooling said solution to room temperature, dissolving said cross linking agent in said cooled solution, adding nano size particles of silicon dioxide, then shaking said mixture well; allowing said mixture to stand for 1–4 days at room temperature.

* * * * *